July 19, 1949.　　　M. KALFAIAN　　　2,476,303
IMPULSE COUNTER

Filed Jan. 4, 1947　　　　　　　　　　　　　　2 Sheets-Sheet 2

INVENTOR.
BY

Patented July 19, 1949

2,476,303

UNITED STATES PATENT OFFICE 2,476,303

IMPULSE COUNTER

Meguer Kalfaian, Asbury Park, N. J.

Application January 4, 1947, Serial No. 720,282

2 Claims. (Cl. 250—27)

(Granted under the act of March 3, 1883, as amended April 30, 1928; 370 O. G. 757)

The invention described herein may be manufactured and used by or for the Government for governmental purposes, without the payment of any royalty thereon.

The present invention relates to electronic relaying systems, and more particularly to electronic trigger circuits which will respond to odd shaped signal waves that may be randomly distributed within zero to a wide range of frequencies.

In general practice, the counting of the randomly distributed pulses from Geiger-Müller tubes and ionization chamber have been mainly performed by a stage of the well known thyratron or the vacuum tube scale-by-two trigger circuit to divide by two, and this followed by successive stages of trigger circuits to scale down these pulses at a rate at which a relatively slow mechanical recorder would operate to any desired efficiency. However, the ultimate efficiency that can be reached is determined by the resolving power of the first stage of the scaling circuit. The limited operating condition of the first stage of the scaler or trigger circuit is that the triggering action of the circuit from one equilibrium state to the other at each incident pulse depends upon the series RC time constants. Due to the fact that the recovery time of the condenser should be short for high speed operation, the circuit will not respond satisfactorily to long pulses because during the input pulse the tubes on both sides of the trigger circuit have low impedance and will quench cross pulses. Then again, it is required for such operation, that the incoming pulses should have either steep rise or steep fall to avoid errors. This results in another undesirable objection that, counting instruments of this character are subject to miss some of the incoming pulses if they are distributed within a wide range of frequencies.

Accordingly, the object of this invention is to provide a scale-by-two circuit arrangement wherein the usually employed capacitive coupling element is eliminated. Due to the direct coupled operation of the arrangement, the scaling circuit is rendered responsive to odd wave shapes in a wide range of frequencies.

In the preferred embodiment of the invention, the scaling circuit includes a first and a second directly cross-coupled trigger circuit, which by further direct coupling cross control each other's state of conduction. The operating performance is such that, while the incoming signal reverses the state of conduction of the said second trigger circuit, the said first trigger circuit remains unactivated until the said incoming signal ceases substantially to a minimum, whereupon the said first trigger circuit reverses under the direct cross-control of the said last reversed state of the said second trigger circuit. Due to the inherently delayed operating time interval between the said second and first trigger circuits, the arrangement will also be found useful in applications where it is desired to transmit information as to when a signal has arrived and when it has ceased to a minimum.

A further object of the invention is to provide a chain arrangement of direct coupled trigger circuits for counting the scaled signals of the aforementioned first stage, which in combination forms a complete counting system.

The novel features of my invention will be more apparent to the skilled in the art from the following detailed description with reference to the accompanying drawings, wherein.

Figure 1:
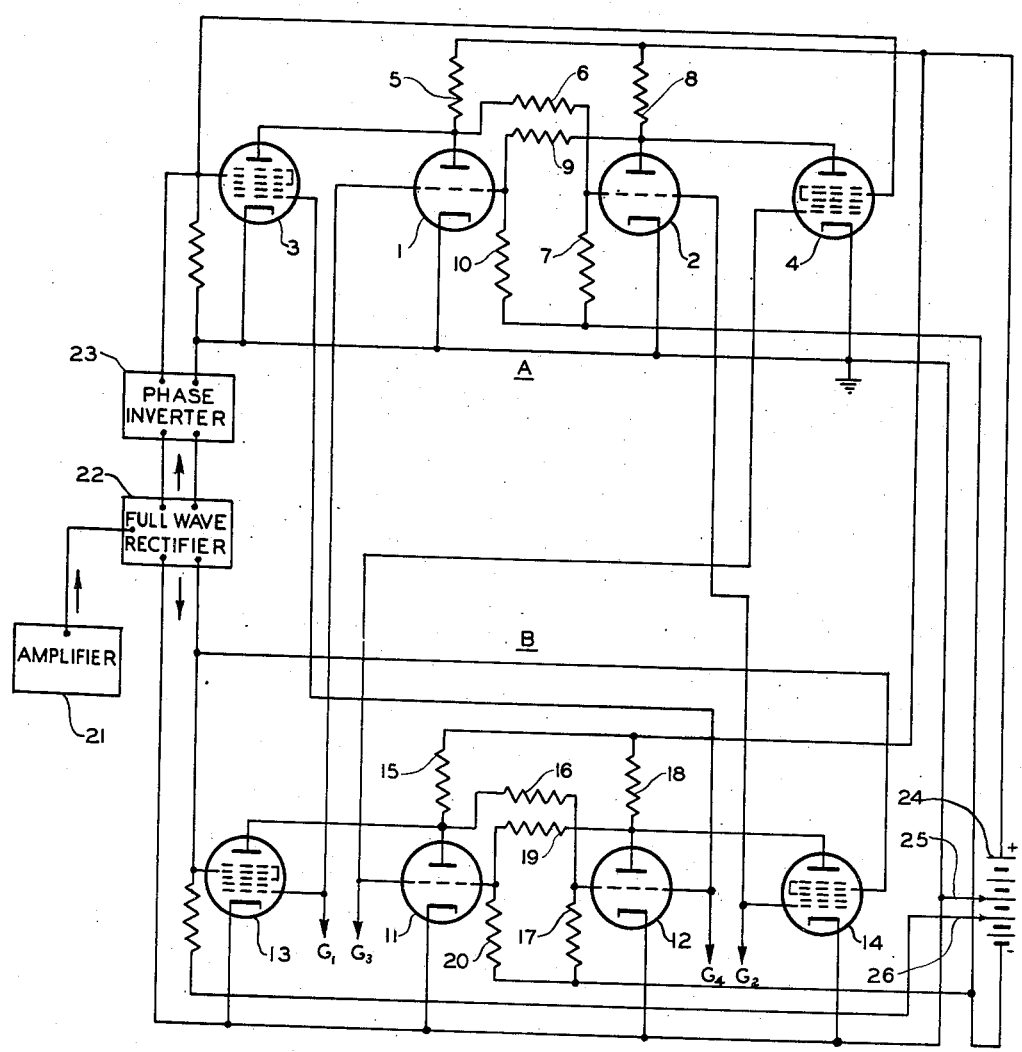
Figure 1 is a diagram of directly cross-coupled scale-by-two relay circuits embodying the invention.

Proceeding now to a detailed description of the invention, a reference is first made to Figure 1, which shows two direct-coupled electronic relay circuits directly cross-coupled to each other, and for convenience, they are marked A and B. The relay circuit A comprises relay tubes 1 and 2, and exciter tubes 3 and 4. The voltage variations across the plate circuit resistance 5 of tube 1 is directly applied to the control grid of tube 2 through the series connected resistances 6 and 7, while the voltage variations across the plate circuit resistance 8 of tube 2 is directly applied to the control grid of tube 1 through the series resistances 9 and 10.

The relay B circuit comprises relay tubes 11 and 12, and exciter tubes 13 and 14. The voltage variations across the plate circuit resistance 15 of tube 11 is directly applied to the control grid of tube 12 through the series connected resistances 16 and 17, while the voltage variations across the plate circuit resistance 18 of tube 12 is directly applied to the control grid of tube 11 through the series connected resistances 19 and 20.

The exciter tubes 3 and 4 of relay A are chosen to have multicontrol elements, and their plates are connected in parallel with the plates of relay tubes 1 and 2 respectively. Similarly, the exciter tubes 13 and 14 of relay B are chosen to have multicontrol elements, and their plates are connected in parallel with the plates of relay tubes 11 and 12 respectively.

One of the control grids of both of the exciter tubes 3 and 4 of relay A are directly cross connected with the control grids of relay tubes 11 and 12 of relay B, while one of the multicontrol grids of both of the exciter tubes 13 and 14 of relay B are directly connected to the control grids of relay tubes 1 and 2 of relay A respectively.

The incoming signals amplified by 21 (shown in block diagram), are full wave rectified by 22, such that, all incoming signals are obtained in positive polarity, and applied to the second control grids of exciter tubes 13 and 14 of relay B simultaneously, as shown by the parallel connection of said grids.

The positive signals obtained from 22 are phase inverted by 23 (shown in block diagram), and applied in negative polarity to the second control grids of the exciter tubes 3 and 4 of relay A simultaneously, as shown by the parallel connection of said grids.

It will be noted in Figure 1, that, the series connected resistances 5, 6, 7 and 8, 9, 10 of relay A, and the series connected resistances 15, 16, 17 and 18, 19, 20 of relay B, act as voltage dividers across the plate potential supply 24. The voltage divisions at the control grids of relay tubes 1 and 2 of relay A, and the voltage divisions at the control grids of relay tubes 11 and 12 of relay B are normally in equal magnitudes, and since these grids are connected at positive potentials across said dividers, the cathodes of all said tubes 1, 2, 3, 4 and 11, 12, 13, 14, are connected in parallel and varied across said potential 24 by contact 25 until the proper desired bias potential for all said control grids is obtained. However, the bias potential for the second control grids of the exciter tubes 13 and 14 of relay B is obtained separately by contact 26, which is normally varied to substantially plate current cut-off of said tubes.

A normal state of conductance or non-conductance of the tubes 1, 2, 3, 4 and 11, 12, 13, 14 of the circuit arrangement given in Figure 1 may be assumed as follows:

Since the second control grids of the exciter tubes 13 and 14 of relay B are normally biased negatively, we may assume that these tubes have no plate current flow. Now assuming that tube 11 is initially conducting, the voltage across the plate circuit resistance 15 of said tube drops, and the control grid of tube 12 becomes negatively biased with respect to its cathode, and the plate current of tube 12 drops to minimum. We may therefore assume that the tube 11 is conducting in steady state having obtained zero bias upon its control grid, and the tube 12 is non-conducting in steady state having obtained a large negative bias upon its control grid. We observe that the control grid of tube 12 is directly connected to the first control grid of the exciter tube 3 of relay A, and accordingly the tube 3 is non-conducting. The control grid of tube 11 of relay B is directly connected to the first control grid of the exciter tube 4 of relay A, and since the second control grids of both 3 and 4 tubes are normally biased near to ground potential, the tube 4 conducts plate current. The voltage across the plate circuit resistance 8 drops and applies a large negative bias upon the control grid of tube 1. Consequently, the tube 1 is non-conducting and the tube 2 is conducting in a stable state.

Now assume that a positive signal arrives at the second control grids of the exciter tubes 13 and 14 to shift the bias upon said grids towards ground potential. The first control grid of tube 13 being directly connected to the control grid of tube 1, and since said last named grid having initially received large negative bias, the plate current of tube 13 remains non-conducting. However the first control grid of tube 14 being directly connected to the control grid of tube 2, and since said last named grid having initially received near ground potential, the tube 14 starts conducting. The voltage across the plate circuit resistance 18 drops and applies a negative potential upon the control grid of tube 11. As the plate current of tube 11 decreases, the voltage across the plate circuit resistance 15 increases and drives the control grid of tube 12 towards ground potential. The function being that, as the plate current of tube 11 decreases, the plate current of tube 12 increases until they both reach an equilibrium. As the plate current of tube 12 increases further than said equilibrium point, the plate current of said tube suddenly assumes its highest conductance, and the plate current of tube 11 drops to minimum. At this triggering instant it will be noted that the bias potentials upon the first control grids of the exciter tubes 3 and 4 of relay A are reversed, by virtue of the fact that their grids are directly connected to the control grids of tubes 11 and 12 of relay B. However, while the incoming signal has activated the exciter tube 14 of relay B, the same incoming signal is applied to the second control grids of exciter tubes 3 and 4 of relay A in negative polarity. Therefore, while the incoming signal resides, the exciter tubes 3 and 4 of relay A remain inactivated. When the incoming signal ceases to a substantially minimum value, the second control grid of the exciter tube 3 assumes a ground or nearly ground potential, and since the first control grid of said tube has already received a ground potential from the control grid of tube 12 of relay B, the voltage across the plate circuit resistance 5 of tube 1 of relay A drops, and the tubes 1 and 2 alternate their stable conductive states. Now, the cut-off bias voltages upon the first control grids of the exciter tubes 3 and 4 of relay A, and the exciter tubes 13 and 14 of relay B are reversed, so that, when the following signal arrives the stable conductive states of relay A and relay B are reversed by the same previous performance as explained.

At the output of the circuit arrangement given in Figure 1, alternate pulses are obtained at each triggering action. The signals obtained from $G_3$ and $G_4$ will be quite near the beginning of the incoming signal, whereas, the signals obtained from $G_1$ and $G_2$ will be quite near the end of the arrival of said incoming signal. Because of the alternate signals obtained from the circuit arrangement given in Figure 1, the following chain of scaling triggers may be devised to operate by alternate signals. Since the rise and fall of the wave-form of the output pulses of Figure 1 will be substantially uniform, even though randomly distributed, the coupling of the output of Figure 1 to the chain of trigger circuits may either be resistance-capacity coupling, or of direct coupling. However, for convenience, direct coupling is shown in the drawing.

Figure 2:
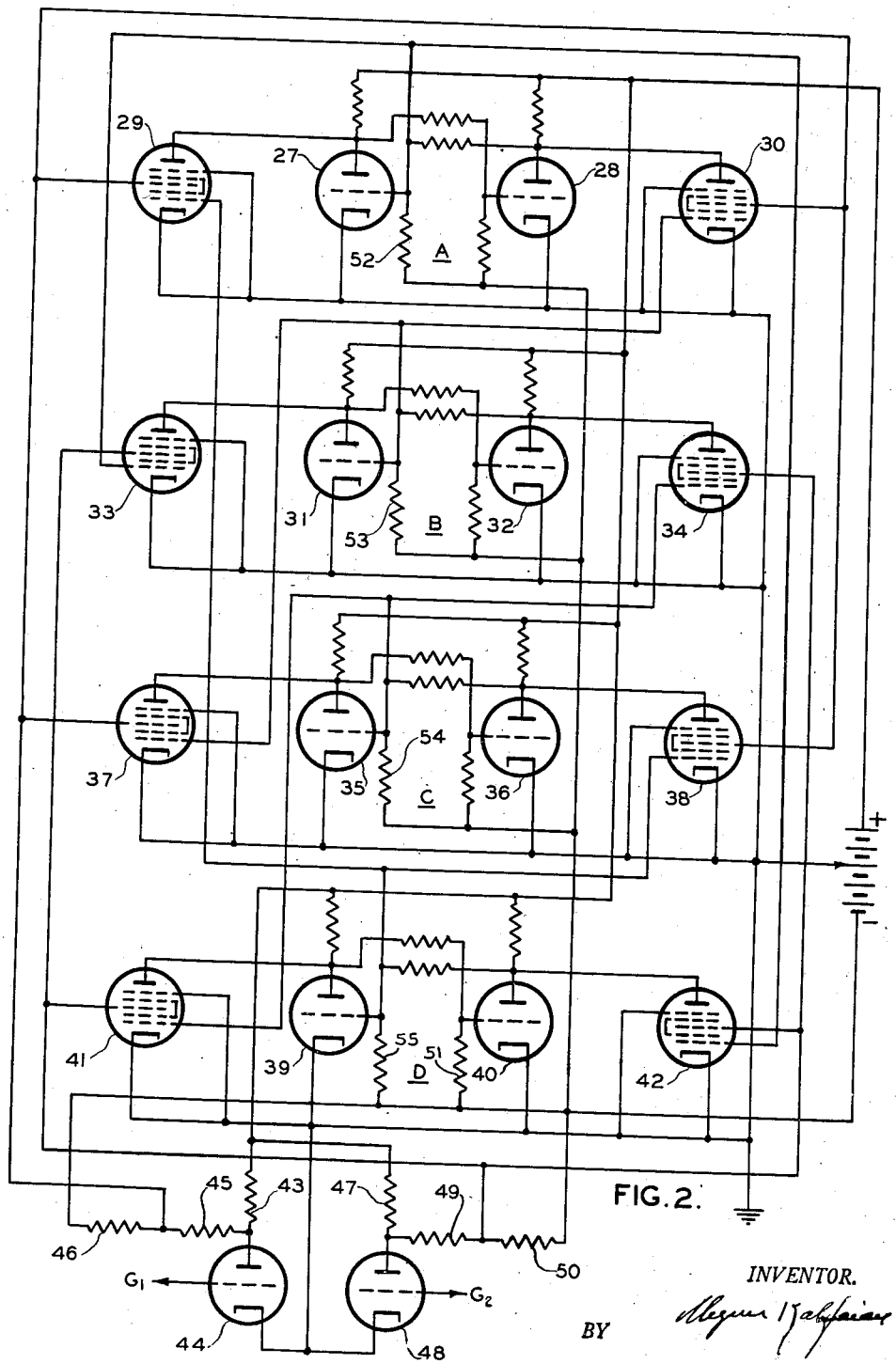
Figure 2 is a diagram of a return chain of direct coupled relay circuits in accordance with the invention.

Figure 2 shows a direct coupling chain of four trigger relay circuits, which may conveniently be marked, as, relay A comprising relay tubes 27, 28 and exciter tubes 29 and 30; relay B comprising relay tubes 31, 32 and exciter tubes 33, 34; relay C comprising relay tubes 35, 36, and exciter tubes 37, 38; relay D comprising relay tubes 39, 40 and exciter tubes 41, 42.

The exciter tubes 29, 30, 33, 34, 37, 38 and 41, 42 are chosen having double control grids, however, other multicontrol tubes may be employed, such as pentodes, in which case, the suppressor or screen grid voltages may be varied as a second series control element for the flow of plate currents of said tube. This also applies to the exciter tubes 3, 4 and 13, 14 in Figure 1.

The second control grids of the exciter tubes 29, 30 and 37, 38 are connected in parallel and receive a normal plate current cut-off negative bias from the plate circuit resistance 43 of tube 44 and the voltage dividing series resistances 45 and 46. Similarly, the second control grids of the exciter tubes 33, 34 and 41, 42 are connected in parallel and receive a normal plate current cut-off negative bias from the plate circuit resistance 47 of tube 48 and the voltage dividing series resistances 49 and 50. The control grids of tubes 44 and 48 are marked $G_1$ and $G_2$, indicating direct coupling to the grids $G_1$ and $G_2$ of tubes 13 and 14 in Fig. 1.

Proceeding now to the chain operation of the serially direct-coupled trigger circuits A, B, C and D in Fig. 2, we will assume as a reference condition of the relays, such that, the relay tubes 28, 32, 36 and 39 are normally conducting. We will also assume that this reference condition has been last effected by the arrival of a negative signal upon $G_2$ of tube 48. Now, when a negative signal arrives upon $G_1$ of tube 44, a positive potential from across the plate circuit resistance 43 and the voltage dividing resistances 45 and 46 of tube 44 is directly applied upon the second control grids of the exciter tubes 29, 30 of relay A, and the exciter tubes 37, 38 of relay C. It will be noted that the first control grids of exciter tubes 30 and 37 are directly connected to the control grid of relay tube 31 of relay B. As had been assumed previously, in the normal reference condition of the relays A to D, the tube 31 of relay B is non-conductive due to a large negative bias received upon its control grid by the conductive state of relay tube 32. Accordingly, the exciter tubes 30 and 37 of relays A and C are rendered inoperative. However, the first control grid of the exciter tube 29 of relay A receives a near ground potential by direct connection to the control grid of conductive tube 39 of relay D, and a plate current flow through the said tube causes relay A to trigger its state of conduction, such that, tube 27 becomes conductive and tube 28 non-conductive.

When the following negative pulse arrives at the control grid $G_2$ of tube 48, a positive potential from across the plate circuit resistance 47 and the voltage dividing resistances 49 and 50 of tube 48 is directly applied upon the second control grids of the exciter tubes 33, 34 of relay B, and the exciter tubes 41, 42 of relay D. The first control grid of exciter tube 33 having near ground potential by direct connection to the control grid of the conducting relay tube 27 of A, the tube 33 becomes active and triggers relay B, such that, tube 31 becomes conductive and tube 32 non-conductive. Similarly, the first control grid of the exciter tube 42 of relay D having near ground potential by direct connection to the control grid of the conducting relay tube 27 of A, becomes active and triggers the relay D, such that, tube 40 becomes conductive and tube 39 non-conductive. The ground potential across the grid circuit of relay tube 31 of relay B is directly applied to the first control grid of the exciter tube 30 of relay A, and also to the first control grid of the exciter tube 37 of relay C, hence, this direct coupling prepares said exciter tubes to be driven conductive when the following negative pulse arrives at $G_1$. When a negative pulse arrives at $G_1$, the relays A and C are triggered to new stable states, that is, the relay tube 28 of relay A becomes conductive, and the relay tube 35 of relay C becomes simultaneously conductive. It will be noted that the negative signal upon $G_1$ excites the second control grids of the exciter tubes 29 and 30 of relay A, and the exciter tubes 37 and 38 of relay C. However, the exciter tubes 29 and 38 are prevented being activated by the negative cut-off potential which resides during said pulsing period at the control grid of the relay tube 39 of relay D. The ground potential developed across the grid circuit of relay tube 35 of relay C is applied to the first control grid of the exciter tube 34 of relay B and also to the first control grid of the exciter tube 41 of relay D. Hence, on the arrival of a negative pulse upon $G_2$, the relay tube 32 of relay B becomes conductive, and also the relay tube 39 of relay D becomes conductive, whereupon, the chain counting repeats.

For convenience, the successive relaying operation is marked as follows: Initial setting of the relays,

| Relay | Conducting tube | Relay | Non-conducting tube |
|---|---|---|---|
| A | 28 | A | 27 |
| B | 32 | B | 31 |
| C | 36 | C | 35 |
| D | 39 | D | 40 | thus, by the following alternate pulses,

| Relay | Conducting tube | Relay | Non-conducting tube |
|---|---|---|---|
| D | 39 | D | 40 } Pulse 1 from $G_1$ |
| A | 27 | A | 28 } |
| B | 31 | B | 32 } Pulse 2 from $G_2$ |
| D | 40 | D | 39 } |
| A | 28 | A | 27 } Pulse 3 from $G_1$ |
| C | 35 | C | 36 } |
| B | 32 | B | 31 } Pulse 4 from $G_2$ |
| D | 39 | D | 40 } |

For an initial setting of the relay circuits, as shown above, the grid circuit resistances 51, 52, 53 and 54 of the relay tubes 27, 31, 35 and 40 may be short circuited momentarily either by manual switches or mechanical relays.

It will be noted that with the relay arrangement of Figure 2, any number of stages may be added to fit a particular application. Also, that the direct cross-couplings of the relay circuits shown in Figure 1 and Figure 2, are not limited to plate circuit couplings, as cathode circuit couplings may be employed. Accordingly, the invention is not limited to the specific details, but that its scope is defined by the claims.

What is claimed is:

1. In an impulse counting system, a scale-by-two impulse dividing arrangement comprising a directly cross-controlled combination of a first and second trigger circuits; each of said trigger circuits comprising a first and a second tube of the grid-controlled type so cross-coupled that while one tube is conducting it imposes a high direct-current negative voltage upon the control grid of its mate tube to render it substantially non-conductive, said first and second tubes of the said first and second trigger circuits in the said aforementioned arrangement having associate exciter tubes each of which having a first and a second control grid and connected in a manner such that in the said first trigger circuit an exciter tube bearing the numeral as a third tube initiates the conductance of the second tube by direct coupling and an exciter tube bearing the numeral as a fourth tube initiates the conductance of the first tube by direct coupling; and in the said second trigger circuit an exciter tube bearing the numeral as a fifth tube initiates the conductance of the second tube by direct coupling and an exciter tube bearing the numeral as a sixth tube initiates the conductance of the first tube by direct coupling, a source of signals randomly or evenly distributed in connection with the aforesaid arrangement and means therewith for applying said signals upon one of the control grids of the said fifth and sixth exciter tubes of the said second trigger circuit simultaneously in positive direction to drive said grids to near cathode potential from a normal high negative bias; and means for simultaneously applying said last mentioned signals upon one of the control grids of the said third and fourth exciter tubes of the said first trigger circuit simultaneously in negative direction to drive said grids to a high negative bias from a normal near cathode potential, the other control grid of the said third exciter tube of the said first trigger circuit having direct coupling with the first tube of the said second trigger circuit in a manner such that while said last mentioned first tube is conducting it imposes a high negative bias upon said grid of the said third exciter tube rendering it inoperative; and the other control grid of the said fourth exciter tube of the said first trigger circuit having direct coupling with the second tube of the said second trigger circuit in a manner such that while said last mentioned second tube is conducting it imposes a high negative bias upon said grid of the said fourth exciter tube rendering it inoperative, the other control grid of the fifth exciter tube of the said second trigger circuit having direct coupling with the second tube of the said first trigger circuit in a manner such that while said last mentioned second tube is conducting it imposes a high negative bias upon said grid of the said fifth exciter tube rendering it inoperative; and the other control grid of the said sixth exciter tube of the said second trigger circuit having direct coupling with the first tube of the said first trigger circuit such that while said last mentioned first tube is conducting it imposes a high negative bias upon the said grid of the said sixth exciter tube rendering it inoperative, whereby by the said manner of direct cross-coupling of the said first and second trigger circuits a triggering performance is effected such that while the aforesaid incoming positive signal reverses the said second trigger circuit under the direct cross-coupled guidance of the said first trigger circuit the said first trigger circuit remains inactivated by the reception of the said last mentioned signal in negative direction until the said signal decreases substantially whereupon the said first trigger circuit reverses under the control of the said last reversed state of the said second trigger circuit, and the incoming signals alternate in an outgoing circuit or circuits for chain counting.

2. In an impulse counting arrangement the combination of a direct coupled chain of trigger circuits, a first stage of a scale-by-two circuit as in claim 1 for transforming the incoming random signals into signals of alternate polarities in outgoing first and second channels, in the aforesaid chain each trigger circuit comprising a first and a second tube of the grid controlled type so cross-coupled that while one tube is conducting it imposes a high direct-current negative voltage upon the control grid of its mate tube to render it substantially non-conductive, said first and second tubes being associated with exciter tubes; each having a first and a second control grid and connected in a manner such that an exciter tube bearing the numeral as a third tube initiates the conductance of the said second tube by direct coupling and an exciter tube bearing the numeral as a fourth tube initiates the conductance of the said first tube by direct coupling, means for applying the alternate signals from the aforesaid first channel to the said second control grids of the said third and fourth exciter tubes of every second succeeding trigger circuit in the said chain; and means for applying the alternate signals from the aforesaid second channel to the said second control grids of the said third and fourth exciter tubes of every other succeeding trigger circuit in the said chain, a direct coupling of the circuit of the second tube in each succeeding trigger stage to the aforesaid first control grids of the fourth exciter tube in a preceding stage and to the third exciter tube in a succeeding stage in a manner such that while said second tubes are conducting the said controlled exciter tubes become inoperative respectively, whereby by the said manner of direct intercouplings a relaying action is effected such that while one trigger stage reverses its state of conduction it causes a trigger circuit preceding two stages to reverse conduction and while simultaneously the aforesaid trigger stage prepares a succeeding trigger stage for reversal when the following alternate signal arrives.

MEGUER KALFAIAN.

REFERENCES CITED

The following references are of record in the file of this patent:

UNITED STATES PATENTS

| Number | Name | Date |
|---|---|---|
| 2,305,625 | Lauer | Dec. 22, 1942 |
| 2,331,986 | Lauer | Oct. 19, 1943 |
| 2,384,379 | Ingram | Sept. 4, 1045 |
| 2,407,320 | Miller | Sept. 10, 1946 |

OTHER REFERENCES

Review of Scientific Instruments, vol. 14, June 1943, "An Improved Cosmic-Ray Radio Sonde," by Pickering, pp. 171–173. (Copy in Div. 10.)